US012317060B2

(12) United States Patent
Rondeau et al.

(10) Patent No.: US 12,317,060 B2
(45) Date of Patent: May 27, 2025

(54) AUDIO METHOD AND SYSTEM FOR A SEAT HEADREST

(71) Applicant: Faurecia Clarion Electronics Europe, Paris (FR)

(72) Inventors: Jean Francois Rondeau, Presles (FR); Christophe Mattei, Linköping (SE); Nicolas Pignier, Stockholm (SE)

(73) Assignee: Faurecia Clarion Electronics Europe, Paris (FR)

( * ) Notice: Subject to any disclaimer, the term of this patent is extended or adjusted under 35 U.S.C. 154(b) by 221 days.

(21) Appl. No.: 17/789,076

(22) PCT Filed: Dec. 22, 2020

(86) PCT No.: PCT/EP2020/087612
§ 371 (c)(1),
(2) Date: Jun. 24, 2022

(87) PCT Pub. No.: WO2021/130217
PCT Pub. Date: Jul. 1, 2021

(65) Prior Publication Data

US 2023/0027663 A1 Jan. 26, 2023

(30) Foreign Application Priority Data

Dec. 24, 2019 (FR) .......................................... 915546

(51) Int. Cl.
*H04S 7/00* (2006.01)
*G10K 11/178* (2006.01)
*H04R 5/02* (2006.01)

(52) U.S. Cl.
CPC .................................... *H04S 7/303* (2013.01)

(58) Field of Classification Search
None
See application file for complete search history.

(56) References Cited

U.S. PATENT DOCUMENTS

2004/0129478 A1* 7/2004 Breed ..................... B60R 22/20 180/273
2009/0092284 A1* 4/2009 Breed ................. B60R 21/0153 382/103

(Continued)

FOREIGN PATENT DOCUMENTS

DE 102013202810 A1 8/2014

OTHER PUBLICATIONS

French Search Report corresponding to French Application No. FR 1915546, dated Aug. 21, 2020, 2 pages.

(Continued)

*Primary Examiner* — Qin Zhu
(74) *Attorney, Agent, or Firm* — Reising Ethington P.C.

(57) ABSTRACT

An audio processing method for an audio system for a seat headrest, the audio system having at least two loudspeakers positioned on either side of the headrest and an audio processing module designed to apply at least one audio processing operation. The method includes the steps of: acquiring images of the head of a user of the audio system using an image acquisition device; processing the acquired images in order to determine, within a predetermined three-dimensional spatial reference frame, a spatial position of each ear of the user; and, on the basis of said determined spatial positions of the ears of the user and based on calibration information previously recorded in connection with an audio processing operation, determining calibration information for adapting the audio processing operation to the determined spatial positions of the ears of the user. Also included is an associated audio system for a seat headrest.

14 Claims, 5 Drawing Sheets

(56) References Cited

U.S. PATENT DOCUMENTS

| | | | | |
|---|---|---|---|---|
| 2010/0027805 | A1 | 2/2010 | Itou et al. | |
| 2010/0111317 | A1* | 5/2010 | Asao | B64C 1/40 381/71.4 |
| 2012/0008806 | A1 | 1/2012 | Hess | |
| 2015/0049887 | A1* | 2/2015 | Bleacher | G06V 20/59 381/302 |
| 2015/0382129 | A1* | 12/2015 | Florencio | H04R 5/04 381/303 |
| 2016/0165337 | A1* | 6/2016 | Trestain | G10K 11/004 381/387 |
| 2016/0329040 | A1 | 11/2016 | Whinnery | |
| 2019/0349703 | A1 | 11/2019 | Zilberman et al. | |
| 2023/0283979 | A1* | 9/2023 | Fukuda | G06V 10/454 381/309 |

OTHER PUBLICATIONS

International Search Report translation into English for PCT/EP2020/087612, Mar. 23, 2021, 2 pages.
Written Opinion translation into English for PCT/EP2020/087612, Mar. 31, 2021, 7 pages.
French Office Action corresponding to application 20 829 947.9, dated Oct. 11, 2024, 9 pages.
D. Prasad Das et al.: "Performance évaluation of an active headrest using remote microphone technique", Proceedings of Acoustics, 2011, Gold Coast, Australia, Nov. 2-4.

* cited by examiner

AUDIO METHOD AND SYSTEM FOR A SEAT HEADREST

TECHNICAL FIELD

The present invention relates to an audio processing method for an audio system for a seat headrest, and an associated audio system for a seat headrest, the audio processing having the objective of improving the sound quality in the audio system for a seat headrest.

The present invention also relates to a passenger transport vehicle, in particular a motor vehicle, comprising one or more seats, at least one seat being equipped with a headrest and such an audio system.

The invention is in the field of audio systems for vehicles, and in particular for passenger transport vehicles.

BACKGROUND

Audio systems for vehicles generally comprise one or more loudspeakers, adapted to emit sound signals, from a source, for example a car radio, into the vehicle interior. In the field of vehicle audio systems, an important issue is to improve the listening quality of the sound signals for the vehicle users.

For this purpose, audio systems are known that integrate one or more loudspeakers in the seat headrest, for each or for a part of the seats of a vehicle, in order to improve the audio experience of a user installed in a seat equipped with such a headrest.

In order to further improve the audio reproduction, the application of various audio processing operations is contemplated. In particular, noise reduction systems are known, and more particularly active noise reduction or active noise control. Active noise reduction or active noise control consists in applying a filter, in an electronic chain of emission connected to the loudspeaker, this filter having as objective the cancellation of a captured noise, so as to emit a clear sound at a predetermined position (or zone).

The paper "Performance evaluation of an active headrest using remote microphone technique" by D. Prasad Das et al, published in "Proceedings of ACOUSTICS 2011", describes methods of active noise reduction for headrest audio systems, where the headrest includes two loudspeakers and two microphones, positioned relative to a centered position of the user. The active noise reduction in this case is optimized for an intended position of the head of the user for which it has been calibrated.

However, in practice, users are not necessarily positioned in the expected position, and therefore the active noise reduction is sub-optimal.

More generally, this defect is present for any audio system for a seat headrest, since the audio processing operation to improve sound quality is dependent on an intended position of the head of the user.

The invention aims to provide a system for improving headrest audio systems regardless of the position of the head of the user.

SUMMARY

To this end, according to one aspect, the invention proposes an audio processing method for an audio system for a seat headrest, the audio system including at least two loudspeakers positioned on either side of the headrest, and an audio processing module designed to apply at least one audio processing operation. The method includes the steps of:

- acquiring images of the head of a user of said audio system by an image acquisition device,
- processing the acquired images in order to determine, in a predetermined three-dimensional spatial reference frame, a spatial position of each ear, respectively the right ear and the left ear, of the user
- as a function of said determined spatial positions of the ears of the user, and from calibration information previously recorded in connection with an audio processing operation, determination of calibration information allowing said audio processing operation to be adapted to the determined spatial positions of the ears of the user.

Advantageously, the audio processing method allows the audio processing operation to be optimized according to the calculated positions of the ears of the user in a predetermined spatial reference frame.

The audio processing method may also have one or more of the following features, taken independently or in any technically conceivable combination.

The processing of the acquired images comprises an extraction, from at least one acquired image, of markers associated with morphological characteristics of the user, and a determination, in said three-dimensional spatial reference frame, of a spatial position associated with each extracted marker.

The method further includes a generation of a three-dimensional model representative of the head of the user as a function of said extracted markers, and a determination of the spatial positions of each ear of the user in said spatial reference frame from said three-dimensional model.

The extracted markers include only one ear marker relative to one ear of the user, either the left ear or the right ear, the method including a calculation of the spatial position of the other ear of the user as a function of the generated three-dimensional model representative of the head of the user.

The method further includes a prior step of determining calibration information in connection with said audio processing operation for each point of a plurality of points of a calibration grid, each point of the calibration grid being associated with an index and corresponding to a calibration position for the right ear and a calibration position for the left ear, and recording said calibration information in association with a calibration index associated with the calibration point.

Determining calibration information based on the determined spatial positions of the right and left ears of the user includes a neighborhood search to select a point in the calibration grid corresponding to a right ear calibration position and a left ear calibration position that are closest according to a predetermined distance to the determined spatial position of the right ear of the user and the determined spatial position of the left ear of the user, respectively.

The audio processing operation is an active noise reduction, or an active noise control and/or spatialization and/or equalization, of the sound.

According to another aspect, the invention relates to an audio system for a seat headrest comprising at least two loudspeakers positioned on either side of the headrest, and an audio processing module designed to apply at least one audio processing operation. The system comprises an image acquisition device, an image processing device, and a calibration information determination device, and:

the image acquisition device is configured to acquire images of the head of a user of said audio system, the image processing device is configured to perform processing of the acquired images to determine, in a predetermined three-dimensional spatial reference frame, a spatial position of each ear, the right ear and left ear respectively, of the user, the device for determining the calibration information is configured to determine, as a function of said determined spatial positions of the ears of the user, and from calibration information previously recorded in connection with an audio processing operation, determining a calibration information allowing said audio processing operation to be adapted to the determined spatial positions of the ears of the user.

The headrest audio system is able to implement all the features of the audio processing method as briefly described above.

According to one advantageous feature, the audio system for a seat headrest further includes at least one microphone, preferably at least two microphones.

According to another aspect, the invention relates to a passenger transport vehicle comprising one or more seats, at least one seat being equipped with a headrest comprising a headrest audio system, said headrest audio system being configured to implement an audio processing method as briefly described above.

BRIEF DESCRIPTION OF THE DRAWINGS

Further features and advantages of the invention will be apparent from the description given below, by way of illustration and not limitation, with reference to the appended figures, of which.

DETAILED DESCRIPTION

Figure 1:
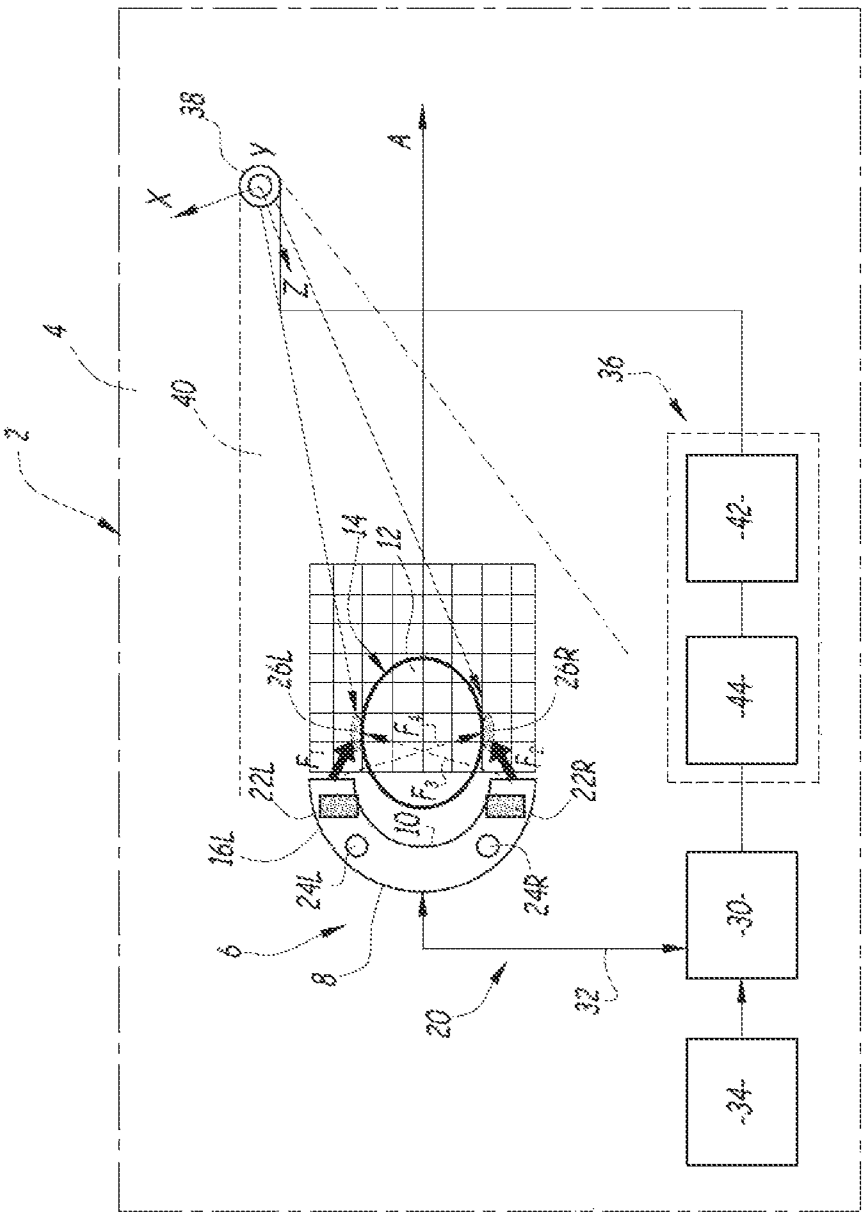
FIG. 1 is a schematic example of a headrest audio system according to one embodiment of the invention.

FIG. 1 schematically illustrates a passenger transport vehicle 2, for example a motor vehicle.

The vehicle 2 comprises a passenger compartment 4 wherein a plurality of seats is placed, not shown, and at least one seat including a headrest 6, coupled to a backrest, generally intended to support the head of the user sitting in the seat.

Preferably, the vehicle 2 includes a plurality of seats having a headrest fitted onto the backrest.

For example, a motor vehicle 2 includes a front row of seats, a rear row of seats, and both front seats are equipped with a headrest 6. The motor vehicle may also have one or more intermediate rows of seats, located between the front row of seats and the rear row of seats.

Alternatively, all the seats are equipped with a headrest.

A headrest 6 includes a central body 8, for example of concave form, forming a support area 10 for the head 12 of a user 14.

Further, as an optional addition, the headrest 6 includes two side flaps 16L, 16R, positioned on either side of the central body 8.

For example, in one embodiment, the side flaps 16L, 16R are fixed. Alternatively, the side flaps 16L, 16R are hinged relative to the central body 8, for example rotatable relative to an axis.

The headrest 4 is provided with an audio system 20 for a seat headrest, including in particular a number N of loudspeakers 22, integrated within a housing of the headrest.

Preferably the loudspeakers are housed on either side of a central axis A of the headrest body 18, for example in the side flaps 16R, 16L when such side flaps are present.

In the example of FIG. 1, the audio system comprises 2 loudspeakers, which are distinguished and noted 22L, 22R respectively.

Furthermore, in the embodiment shown in FIG. 1, the audio system 20 includes P microphones 24, each microphone being housed in a corresponding housing of the headrest. In the example, the audio system 20 includes two microphones 24R, 24L, positioned on either side of the headrest.

These microphones 24L, 24R are particularly adapted to pick up the pressure level of sound signals.

It is understood that if the head 12 of the user, is in a given centered position, as shown in FIG. 1, the distance between each ear 26L, 26R of the user and each loudspeaker 22L, 22R is fixed and known, as well as the cross distances between the ears 26L, 26R and the loudspeakers 22R, 22L. The transfer functions between ears and loudspeakers, dependent on the acoustic fields, and in particular on the distances between ears and loudspeakers, are represented in FIG. 1 by arrows: $F_1$ represents the transfer function between loudspeaker 22L and ear 26L; $F_2$ represents the transfer function between loudspeaker 22R and ear 26R. The cross-transfer functions are additionally represented: $F_3$ represents the transfer function between loudspeaker 22L and ear 26R; $F_4$ represents the transfer function between loudspeaker 22R and ear 26L.

The same is true with regard to the transfer functions between the ears 26L, 26R of the user, and each microphone 24L, 24R.

The audio system 20 further includes an audio processing module 30, connected to the N loudspeakers and the P microphones via a link 32, preferably a wired link. The audio processing module 30 receives sound signals from a source 34, for example a car radio, and implements various audio processes of the received sound signal.

The headrest audio system 20 which includes an audio processing enhancement system 36, implementing a determination of the position of the ears of the user to improve the sound reproduction of the seat headrest audio system 20, is also installed. The enhancement of the sound reproduction is obtained by an audio processing operation calibrated as a function of the ear position of the user.

For example, the audio processing operation is a noise reduction, in particular an active noise reduction, or a spatialization of the sound, or a reduction of crosstalk between seats, an equalization of the sound, or any operation of the sound to improve sound quality whilst listening to music.

In one embodiment, multiple audio processing operations are implemented.

The audio system 20 includes an image acquisition device 38 associated with the headrest 6.

The image acquisition device 38 is, for example, an optical camera, adapted to capture images in a given range of the electromagnetic spectrum, for example in the visible spectrum, the infrared spectrum, or the near infrared spectrum.

Alternatively, the image acquisition device 38 is a radar device.

Preferably, the image acquisition device 38 is adapted to capture two-dimensional images. Alternatively, the image acquisition device 38 is adapted to capture three-dimensional images.

The image acquisition device 38 is positioned in the passenger compartment 4 of the vehicle, in a spatial position chosen so that the headrest 6 is in the field of view 40 of the image acquisition device 38.

For example, in one embodiment, the image acquisition device 38 is placed on or integrated within a housing of an element (not shown) of the passenger compartment 4, located in front of the seat on which the headrest 6 is mounted.

In one embodiment, the image acquisition device 38 is mounted in a fixed position, and its image field of view is also fixed.

According to one variant, the image acquisition device 38 is mounted in a movable position, for example on a movable part of the passenger compartment 4, seat or dashboard, the movement of which is known to an on-board computer of the vehicle.

The mounting position of the image acquisition device 38 is chosen in such a way that translational and/or rotational movements of the head 12 of the user 14 relative to the centered position shown in FIG. 1 remain in the image field of view 40 of the image acquisition device 38. Such movement of the head 12 of the user 14 is schematically illustrated in FIG. 2.

Figure 2:
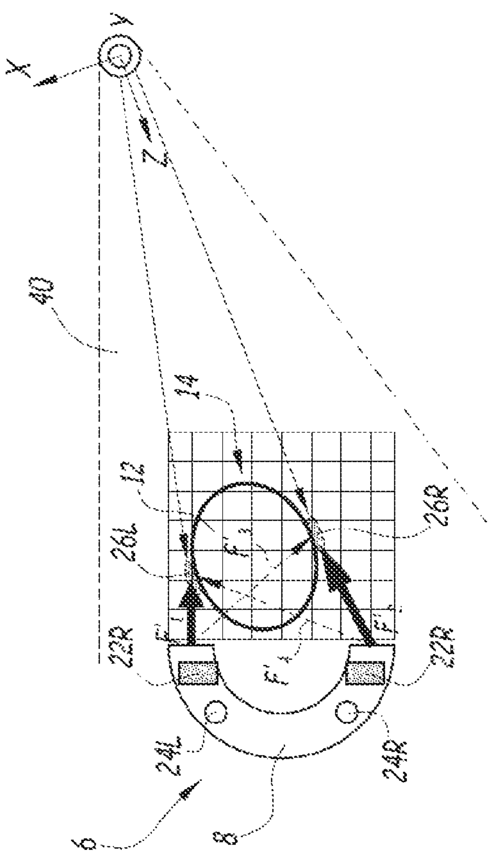
FIG. 2 schematically illustrates a movement of the head of a user in a predetermined reference frame.

As can be noted in FIG. 2, a rotational and/or translational displacement of the head 12 of the user 14 particularly modifies the distances between each ear 26R, 26L of the user 14 and the corresponding loudspeaker 22R, 22L, and consequently the transfer functions, represented by arrows F'1, F'2, F'3 and F'4 in FIG. 2, are modified relative to the transfer functions corresponding to the centered position, represented by arrows F1, F2, F3 and F4 of FIG. 1.

A three-dimensional (3D) spatial reference frame, with center O and axes (X, Y, Z), orthogonal in pairs, is associated with the image acquisition device 38. This 3D reference frame is, in one embodiment, chosen as the spatial reference frame in the audio processing method implemented by the audio system 20 of the headrest 4.

The system 36 further includes an image processing device 42, connected to the image acquisition device 38, for example by a wire link, and configured to determine the position of each ear 26R, 26L of the user in the 3D reference frame, from images acquired by the image acquisition device 38.

As an alternative, not shown, the image processing device 42 is integrated into the image acquisition device 38.

The image processing device 42 is connected to a device 44 for determining calibration information based on the positions of each ear 26R, 26L of the user, intended for adapting an audio processing operation of the headrest audio system 20 to optimize the sound reproduction of this audio system.

In one embodiment, the device 44 is a signal processor, for example a DSP (Digital Signal Processor) integrated into the audio processing module 30.

Figure 3:
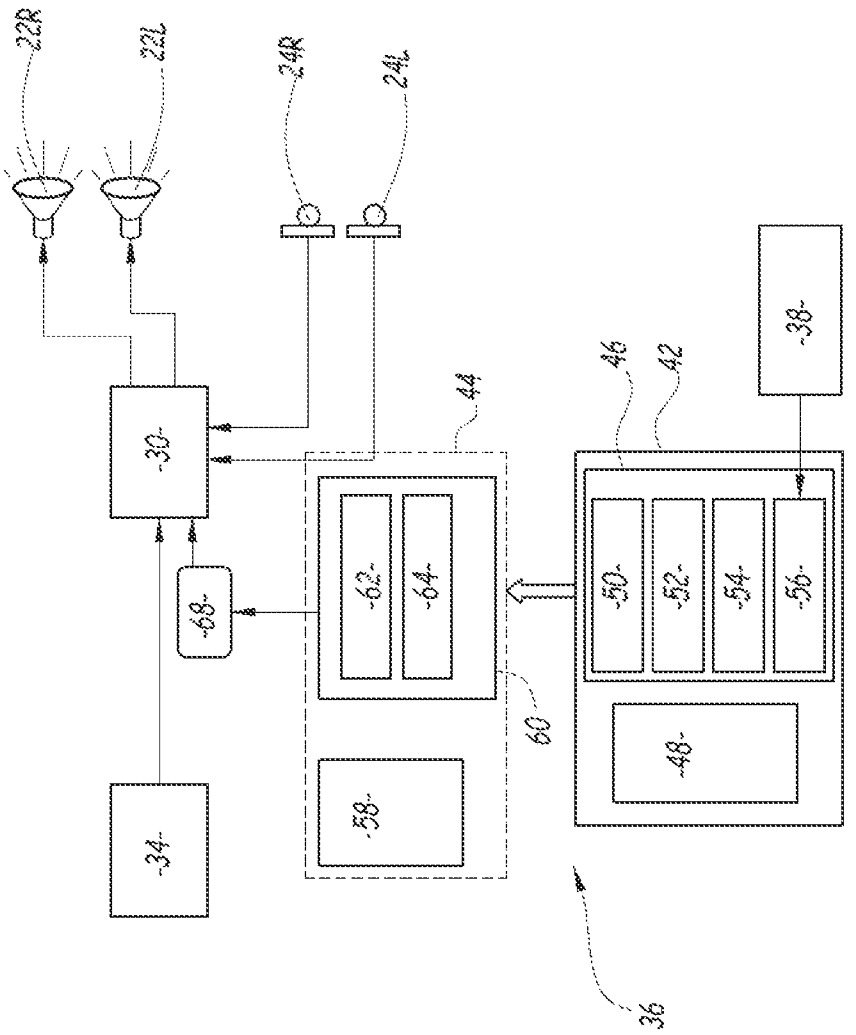
FIG. 3 is a schematic view of an audio system according to an embodiment of the invention.

FIG. 3 is a schematic representation of an audio system for a seat headrest, wherein the image processing device 42 and the device 44 for determining the calibration information, are more particularly detailed.

The image processing device 42 includes a processor 46, for example a GPU (Graphics Processing Unit) type processor, specialized in image processing, and an electronic memory unit 48, for example an electronic memory, for example a RAM or DRAM type memory.

The processor 46 is able to implement, when the image processing device 42 is powered on, an image acquisition module 50, a module 52 for extracting markers representative of morphological characteristics of the head of a user, a module 54 for generating a 3D model representative of the head of a user, and a module 56 for calculating the position of each ear of the user in a 3D reference frame. These modules 50, 52, 54 and 56 are for example in the form of software.

Each of these software programs is able to be recorded on a non-volatile medium, readable by a computer, such as, for example, an optical disk or card, a magneto-optical disk or card, a ROM, RAM, any type of non-volatile memory (EPROM, EEPROM, FLASH, NVRAM).

Alternatively, these modules 50, 52, 54 and 56 are each realized in the form of a programmable logic component, such as an FPGA or an integrated circuit.

Spatial coordinates in the 3D reference frame, for each of the ears of the user, are transmitted to the device 44 for determining the calibration information.

This device 44 is a programmable device comprising a processor 58 and an electronic memory unit 60, for example an electronic memory, such as RAM or DRAM.

In one embodiment, the processor 58 is a DSP, able to implement a module 62 configured to determine a calibration index of a calibration grid derived from the spatial coordinates of the ears received from the image processing device 42 and a module 64 for extracting the calibration information 68 associated with the calibration index from a prior recording.

These modules 62, 64 are for example in the form of software.

Each of these software programs is able to be recorded on a non-volatile medium, readable by a computer, such as for example an optical disk or card, a magneto-optical disk or card, a ROM, RAM, any type of non-volatile memory (EPROM, EEPROM, FLASH, NVRAM).

Alternatively, these modules 62, 64 are each realized in the form of a programmable logic component, such as an FPGA or an integrated circuit.

The calibration information 68 is provided to the audio processing module 30.

The audio processing module 30 implements an audio processing operation using the calibration information 68.

The audio processing module 30 also implements other known audio filtering, which is not described in detail here, as well as digital-to-analog conversion and amplification, to provide a processed audio signal to the loudspeakers 22L, 22R.

When the audio processing operation is active noise reduction, audio signals picked up by the microphones 24R, 24L are also used by the audio processing operation.

Figure 4:
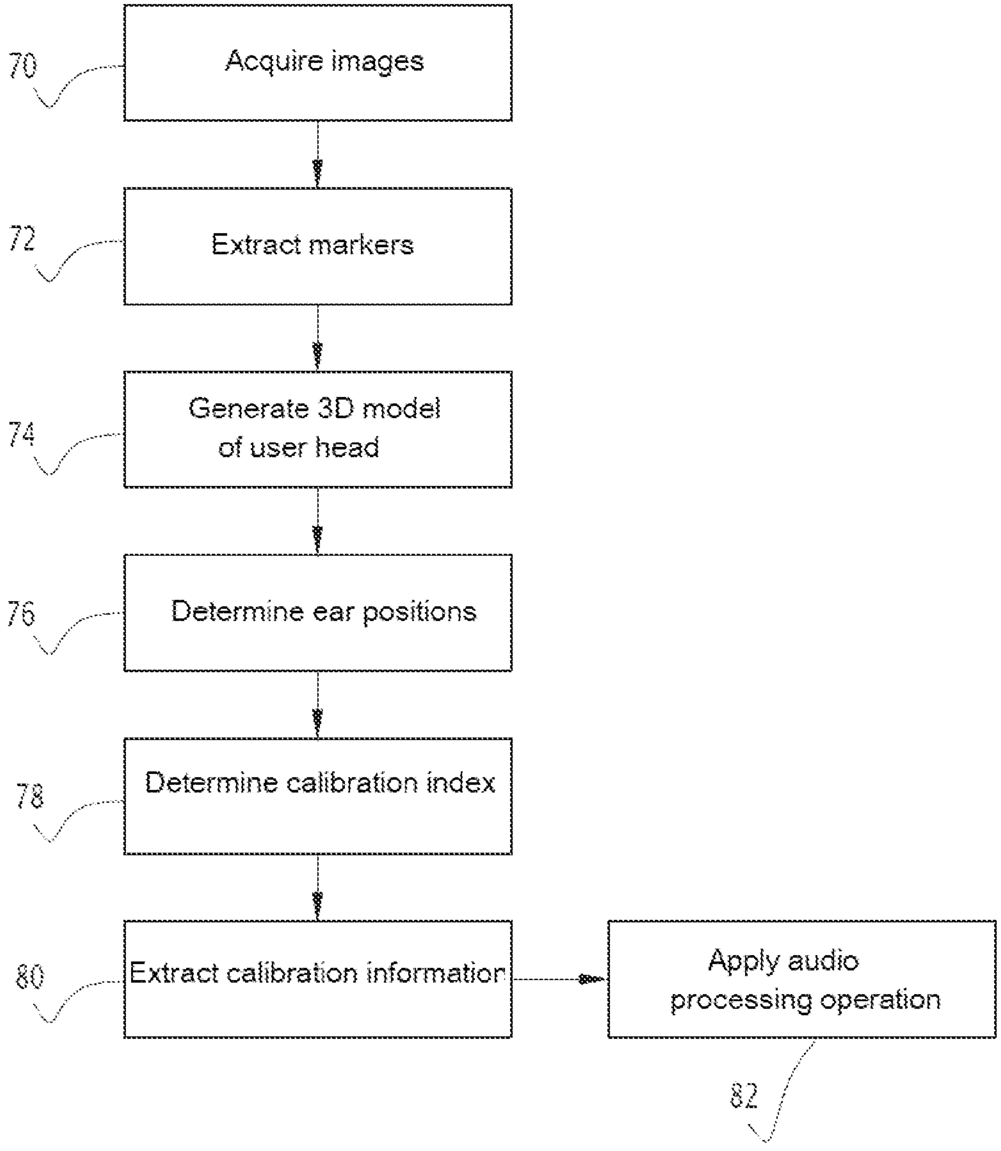
FIG. 4 is a flow chart of the main steps of an audio processing method in one embodiment of the invention.

FIG. 4 is a flow chart of the main steps of an audio processing method for an audio system for a seat headrest according to one embodiment of the invention, implemented in a processing system as described above.

This method includes a step 70 of acquiring images by the image acquisition device. For example, the images are acquired with a given acquisition rate ("frame rate") and are stored successively as digital images.

A digital image in a known way is formed by one or more matrix(es) of digital samples, also called pixels, having an associated value.

In one embodiment, the image acquisition device is adapted to acquire two-dimensional images, thus each acquired digital image is formed of one or more two-dimensional (2D) matrix(es).

Given the positioning of the image acquisition device in the audio system 20, the images acquired, within the field of view of the image acquisition device, are images wherein at least a portion of the head of the user appears when the user is present on the seat to which the headrest is attached.

From one or more of the acquired and stored images, an extraction 72 of markers associated with the morphological features of the user, in particular morphological features of the head. Optionally the morphological features comprise the torso and shoulders as well.

The morphological features comprise in particular: eyes, mouth, nose, ears, chin, but may also contain the upper body.

Of course, depending on the position of the head of the user in the field of view, it is possible that only part of these features is visible, for example if the user is turned in profile. Moreover, it is possible that some features that could be visible are hidden, for example by the hair of the user. Thus, depending on the position of the head of the user, a subset of morphological features of the head of the user is detectable in the morphological feature marker extraction step 72.

Each morphological feature is, for example, detected in the image by segmentation and represented by a set of pixels of an acquired image. A marker is associated with each morphological feature, and a position of the marker in the 3D reference frame associated with the image acquisition device.

For example, the method described in the article "Monocular vision measurement system for the position and orientation of remote object", by Tao Zhou et al, published in "International Symposium on Photo electronic Detection and Imaging", vol. 6623, is used to calculate the spatial positions of the markers in the 3D reference frame associated with the image acquisition device.

The method then comprises a generation 74 of a representative three-dimensional (3D) model of the head of the user as a function of said extracted markers, by mapping the morphological feature markers extracted in step 72 onto a standard 3D model of a human head. Preferably, a neural network, previously trained, is used in step 74.

Alternatively, any other method of mapping the morphological feature markers extracted in step 72 onto a standard 3D model of the human head can be used.

Thus, a complete 3D model of the head of the user is obtained, which in particular allows the position of the morphological feature markers not detected in step 72 to be calculated. For example, when the user is rotated in profile, only a portion of their morphological features are detectable in an acquired 2D image, but it is possible to computationally determine the position of the missing features from the 3D model.

The position of each of the two ears of the user, i.e., the position of their right ear and the position of their left ear, in the 3D reference frame, is calculated in the following step 76 of determining the spatial positions of the ears from the 3D model representing the head of the user.

Advantageously, thanks to the use of this 3D model, the position of the two ears of the user is obtained in all cases.

In particular, the position of an ear, right or left, not visible on an acquired image is determined by calculation, using the 3D module representative of the head of the user.

Thus, at the end of step 76, the position of each ear, represented by a triplet of spatial coordinates in the 3D reference frame: (x,y,z)R and (x,y,z)L.

The method then includes a step 78 of determining an index associated with a point of a predefined calibration grid, called calibration index, as a function of the coordinates (x,y,z)R and (x,y,z)L.

In one embodiment, the determination of an index consists of applying a neighborhood search to select points corresponding to previously recorded ear calibration positions with coordinates $(x_k,y_k,z_k)_R$ (calibration position of the right ear) and $(x_m,y_m,z_m)_L$ (calibration position of the left ear), which are the closest to the points of coordinates $(x, y, z)_R$ (position of the right ear of the user, determined in step 76) and $(x, y, z)_L$ (position of the left ear of the user, determined in step 76). The proximity being evaluated by a predetermined distance, for example the Euclidean distance.

According to a variant, a 2D calibration grid is used, and the operation of determining a calibration index associated with a point of a calibration grid is implemented in an analogous manner for coordinates $(x,y)_R$ and $(x,y)_L$ of each ear and coordinates $(x_k,y_k)$ and $(x_m,y_m)$ of calibration positions.

A calibration index corresponding to the calibration position closest, according to the predetermined distance, to the actual position of the right and left ears is obtained.

The calibration index is used in the next extraction step 80 to extract a calibration information associated with an audio processing operation, from calibration information previously stored in a memory of the computing device 44.

By "calibration information" is meant a set of digital filters previously determined by measurements, this set of digital filters is used to correct or calibrate the audio processing operation to improve, as a function of the distance and/or sound field between the ear and the loudspeaker, the sound reproduction by loudspeakers when the two ears are not facing the loudspeakers or are not at equal distance on each side of the headrest.

In one embodiment, the audio processing operation is active noise reduction, and includes the application of adaptive filters FxLMS (filtered least mean squared).

The calibration information includes, in this embodiment, for each of the ears, a primary transfer function and a secondary transfer function. The primary transfer function $IR_p^L$ (resp $IR_p^{LR}$) is the transfer function between the microphone 24L (resp. 24R) and the ear 26L (resp. 26R), when the acoustic field is formed by the sound signal to be processed. The secondary transfer function $IR_s^L$ ($IR_s^R$) is the transfer function between the microphone 24L (resp. 24R) and the ear 26L (resp. 26R), when the sound field is formed by the sound signal emitted by the corresponding loudspeaker 22L (resp. 22R). As an optional complement, the primary and secondary cross-transfer functions between the right microphone 24R (respectively right loudspeaker 22R) and the left ear 26L, and the left microphone 24L (respectively left loudspeaker 22L) and the right ear 26R are also used.

Thus, for active noise reduction, the calibration information extracted in step 80 comprises 4 transfer functions, previously measured and recorded.

The method ends with the application 82 of the audio processing operation, for example the application of active noise reduction, adapted by using the calibration information obtained in step 80. Thus, the audio processing operation is optimized as a function of the calculated positions of the ears of the user, thereby improving the quality of the sound perceived by the user.

The audio processing method has been described above in the case where the audio processing operation is active noise reduction.

Alternatively, or additionally, other audio processing operations, the performance of which, depends on the position of the ear of the user are implemented, with or without noise reduction. In another embodiment, the audio processing operation is an improvement of the audio perception quality and includes the application of spatialization filters such as binauralization filters. Thanks to the positions of the two detected ears, the spatialization filters are chosen appropriately according to these positions.

Figure 5:
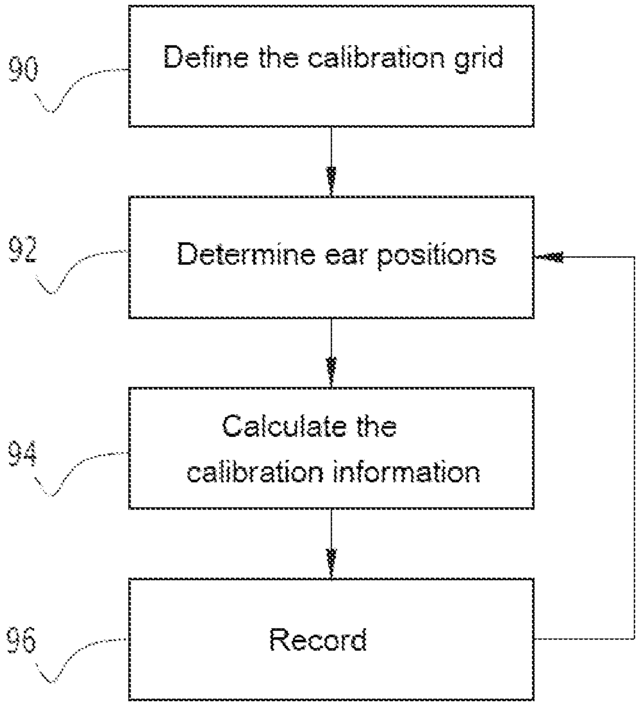
FIG. 5 is a flowchart of the main steps of a preliminary phase of calculation of calibration information according to one embodiment.

One embodiment of a preliminary phase of determining and recording calibration information is described below with reference to FIG. 5.

The preliminary phase comprises a step 90 of defining a calibration grid including a plurality of points, each point being marked by a calibration index.

To define the calibration grid, several spatial positions of the seat to which the headrest is attached are considered, when the seat is mobile in translation, along one or more axes, which is for example the case in a motor vehicle.

Alternatively, the seat is fixed in a given spatial position.

For each spatial position of the seat, several positions of the head of a user, represented by a test dummy in this preliminary phase, are considered.

For each point of the calibration grid, spatial coordinates representative of the calibration position of each ear of the test dummy, in the reference frame of the image acquisition device, are measured and recorded in step 92, in association with the corresponding calibration index.

For the selected audio processing operation, each calibration information, for example the primary and secondary transfer functions for each of the ears in the case of active noise reduction, is calculated in the calibration information calculation step 94.

For example, the measurement of a transfer function, primary or secondary, in a test environment, using a test dummy, is well known to the skilled person. A test sound signal, for example a pink noise, is used, for example, to calculate these transfer functions for each ear of the test dummy.

The calibration information recorded in step 96, is in conjunction with the calibration index and with the spatial coordinates calculated in step 92.

Preferably, the calibration information is stored in the RAM memory of the processor of the processing module used.

Steps 92-96 are repeated for all points on the grid, thereby obtaining a database of calibration information, associated with the calibration grid, for the selected audio processing operation.

An embodiment of the invention has been described above for an audio system for a seat headrest. It is clear that the description above may apply in the same manner for each seat headrest audio system, with an image acquisition device installed for each seat headrest audio system. The prior calibration phase, followed by the implementation of the audio processing operation to improve the sound quality perceived by the user.

Advantageously, the use of mapping of spatial positions of markers representative of morphological characteristics of the user with a representative three-dimensional model of the head of the user makes it possible to obtain the spatial coordinates of the ears of the user in all cases, including when the ears are not detected on the images acquired by the image acquisition device.

The invention claimed is:

1. An audio method for applying in a system for a seat headrest, the audio system including at least two loudspeakers positioned on either side of the headrest, and an audio processing module designed to apply a plurality of audio processing operations, the method comprising:

acquiring images of the head of a user of said audio system by an image acquisition device, processing the acquired images in order to determine, in a predetermined three-dimensional spatial reference frame, a spatial position of each ear, the right ear and the left ear respectively, of the user, and for each audio processing operation of the plurality of audio processing operations, determining calibration information for adapting the audio processing operation to the determined spatial positions of the ears of the user, as a function of the said determined spatial positions of the ears of the user, and from calibration information previously recorded in connection with the audio processing operation, and applying the adapted audio processing operation, wherein the plurality of audio processing operations comprises at least two of: a first audio processing operation, a second audio processing operation, and a third audio processing operation, wherein the first audio processing operation comprises active noise reduction or active noise control, wherein the second audio processing operation comprises sound spatialization, and wherein the third audio processing operation comprises sound equalization.

2. The method according to claim 1, wherein the said processing of the acquired images comprises extracting, from at least one acquired image, markers associated with morphological characteristics of the user, and determining, in said three-dimensional spatial reference frame, a spatial position associated with each extracted marker.

3. The method according to claim 2, further including the generation of a three-dimensional model representative of the head of the user relative to the said extracted markers and determining the spatial positions of each ear of the user in said spatial reference frame from said three-dimensional model.

4. The method according to claim 3, wherein the said extracted markers include only one ear marker relative to either one of the left ear of the user or the right ear, the method comprising a determination of the spatial position of the other ear of the user relative to the generated three-dimensional model representative of the head of the user.

5. The method according to claim 1, further including a prior step of determining calibration information in connection with said audio processing operation for each point of a plurality of points of a calibration grid, each point of the calibration grid being associated with an index and corresponding to a calibration position for the right ear and a calibration position for the left ear, and recording the said calibration information in association with a calibration index associated with the calibration point.

6. The method according to claim 5, wherein determining a calibration information on the basis of the determined spatial positions of the right and left ears of the user includes a neighborhood search to select a point on the calibration grid corresponding to a right ear calibration position and a left ear calibration position that are closest, according to a predetermined distance to the determined spatial position of the right ear of the user and the determined spatial position of the left ear of the user, respectively.

7. The method according to claim 3, wherein the generation of a three-dimensional model representative of the head of the user relative to the said extracted markers applies a neural network previously trained.

8. A headrest audio system configured to implement an audio processing method according to claim 1.

9. The headrest audio system according to claim 8 comprising at least two loudspeakers positioned on either side of the headrest, and an audio processing module able to apply a plurality of audio processing operations, the system further comprising an image acquisition device, an image processing device, and a calibration information determining device, and wherein:

the image acquisition device is configured to acquire images of the head of a user of said audio system, the image processing device is configured to perform processing of the acquired images to determine, in a predetermined three-dimensional spatial reference frame, a spatial position of each ear, the right ear and the left ear respectively, of the user, and for each audio processing operation of the plurality of audio processing operations, the calibration information determination device is configured to determine a calibration information enabling said audio processing operation to be adapted to the determined spatial positions of the ears of the user, on the basis of said determined spatial positions of the ears of the user, and from calibration information previously recorded in connection with the audio processing operation, and to apply the adapted audio processing operation, wherein the plurality of audio processing operations comprises at least two of: a first audio processing operation, a second audio processing operation, and a third audio processing operation, wherein the first audio processing operation comprises active noise reduction or active noise control, wherein the second audio processing operation comprises sound spatialization, and wherein the third audio processing operation comprises sound equalization.

10. The seat headrest audio system according to claim 8, further including at least one microphone, preferably at least two microphones.

11. A passenger transport vehicle comprising one or more seats, at least one seat being equipped with a headrest comprising a headrest audio system, wherein said headrest audio system is configured to implement an audio processing method according to claim 1.

12. An audio method for applying in a system for a seat headrest, the audio system including at least two loudspeakers positioned on either side of the headrest, and an audio processing module designed to apply a plurality of audio processing operations including at least two audio processing operations selected amongst: a first audio processing operation, a second audio processing operation, and a third audio processing operation, wherein the first audio processing operation comprises active noise reduction or active noise control; wherein the second audio processing operation comprises sound spatialization; and wherein the third audio processing operation comprises sound equalization, the method comprising acquiring images of the head of a user of said audio system by an image acquisition device, processing the acquired images in order to determine, in a predetermined three-dimensional spatial reference frame, a spatial position of each ear, the right ear and the left ear respectively, of the user, and for each audio processing operation of the plurality of audio processing operations, determining calibration information for adapting the audio processing operation to the determined spatial positions of the ears of the user, as a function of the said determined spatial positions of the ears of the user, and from calibration information previously recorded in connection with the audio processing operation, and applying the audio processing operation adapted with said calibration information, wherein said determining calibration information comprises:

applying a neighborhood search to select a calibration point on a calibration grid corresponding to a right ear calibration position and a left ear calibration position that are closest to the determined spatial position of the right ear of the user and the determined spatial position of the left ear of the user respectively, and extracting, from a record, calibration information previously calculated, said calibration information being associated with said calibration position for said audio processing operation.

13. The method according to claim 12, wherein said extracting, from a record, calibration information previously calculated is function of a calibration index associated to said selected calibration position.

14. The method according to claim 12, wherein each of the right ear calibration position, the left ear calibration position, the determined spatial position of the right ear of the user and the determined spatial position of the left ear of the user are defined by a triplet of coordinates in the three-dimensional spatial reference frame.

* * * * *